No. 610,062. Patented Aug. 30, 1898.
E. KOENIG & M. L. ERLANGER.
AUTOMATIC CARBONATING APPARATUS.
(Application filed Nov. 19, 1897.)
(No Model.) 2 Sheets—Sheet 1.
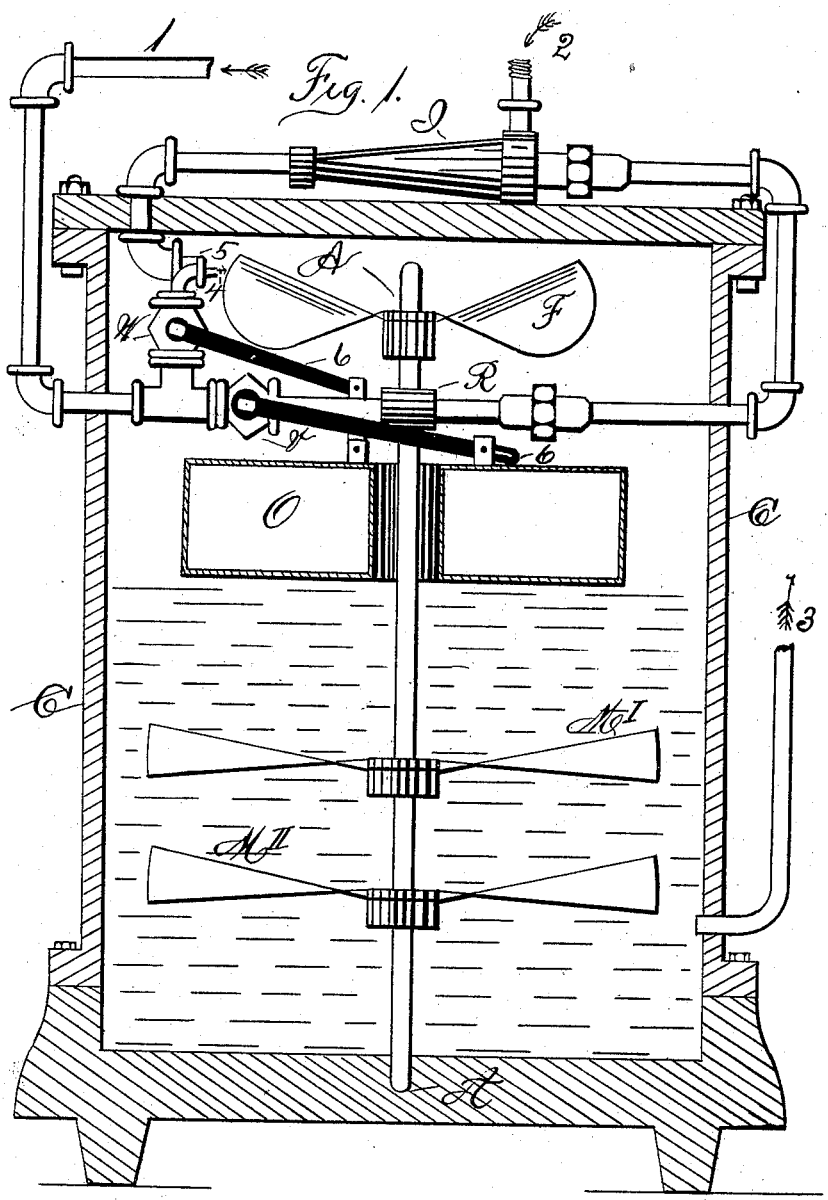
WITNESSES:
INVENTORS
Emil Koenig
Mitchel L. Erlanger
BY
Mitchel L. Erlanger
ATTORNEY.

No. 610,062. Patented Aug. 30, 1898.
E. KOENIG & M. L. ERLANGER.
AUTOMATIC CARBONATING APPARATUS.
(Application filed Nov. 19, 1897.)
(No Model.) 2 Sheets—Sheet 2.
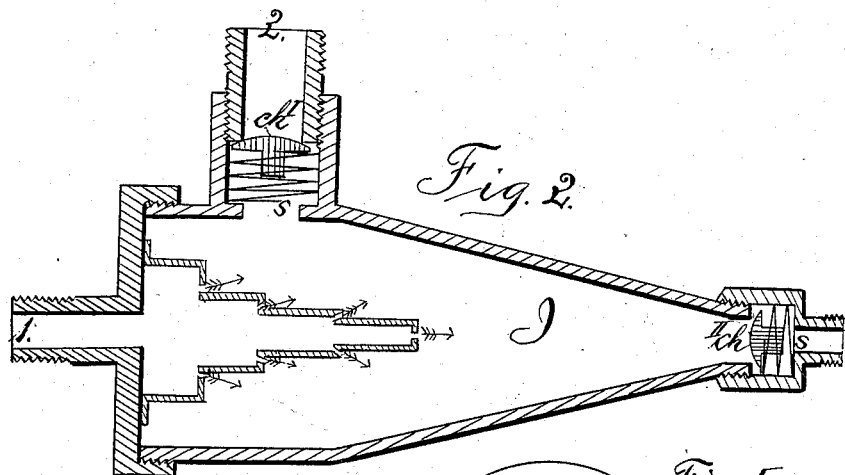
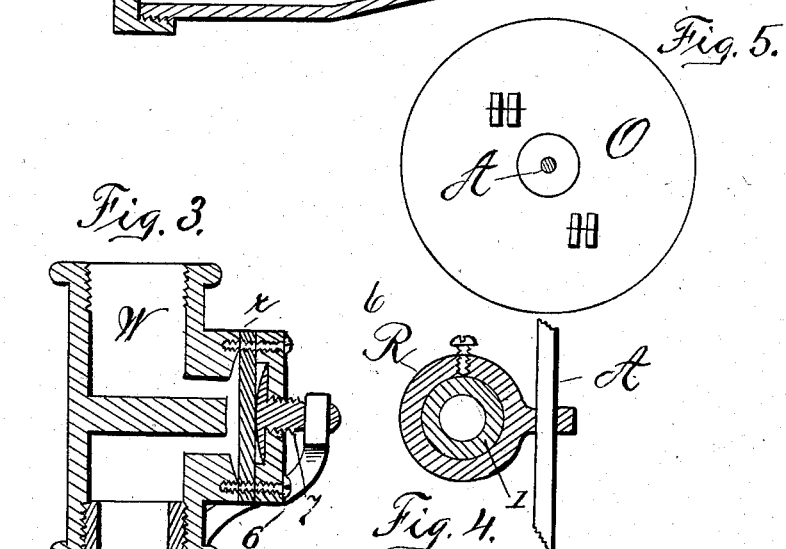
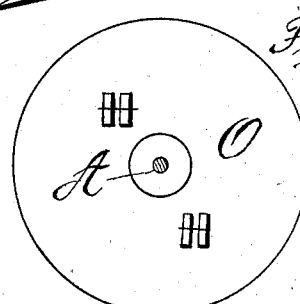
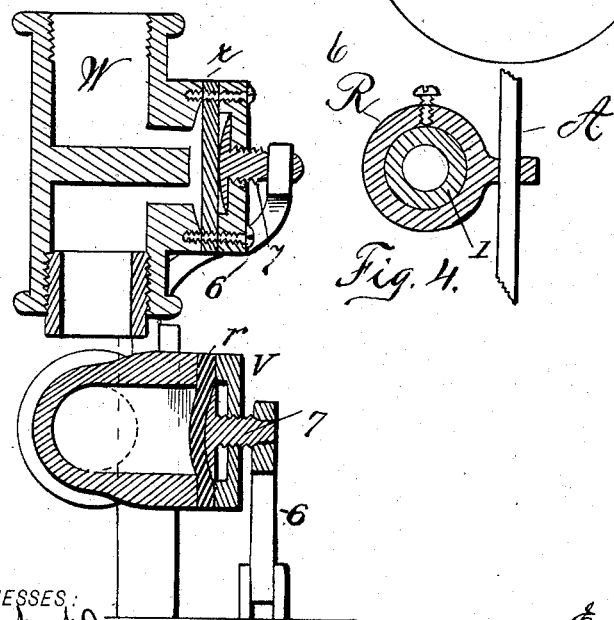

UNITED STATES PATENT OFFICE.

EMIL KOENIG AND MITCHELL L. ERLANGER, OF NEW YORK, N. Y.

AUTOMATIC CARBONATING APPARATUS.

SPECIFICATION forming part of Letters Patent No. 610,062, dated August 30, 1898.

Application filed November 19, 1897. Serial No. 659,210. (No model.)

*To all whom it may concern:*

Be it known that we, EMIL KOENIG, of New York, (Long Island City,) and MITCHELL L. ERLANGER, of the city and county of New York, State of New York, have invented certain new and useful Improvements in Apparatus for Aerating Liquids and Beverages of all Kinds with Carbonic Dioxid, of which the following is a specification.

The present invention relates generally to apparatus for aerating beverages; and it consists of certain means by which the aerating may be effected automatically.

Briefly stated, the invention embraces a closed tank or chamber capable of holding a suitable quantity of water or other beverage that is to be aerated or charged with the gas, such as carbonic-acid gas or carbon dioxid. This tank or chamber is provided with a vertically-movable float connected to operate two valves, both of which control the inflow into the chamber, one of the valves controlling the supply of gas to an injector connected with the water-supply, so that in one position of the float gas will be admitted to the injector to aid by its pressure the feed of the water to the tank or chamber and at the same time more or less carbonate or impregnate the water as it is fed into the chamber. The other valve, also controlled by this float, controls the admission of gas to the chamber. Associated with this float and valves is a rotating device capable, when moved, of agitating the water, and preferably so arranged that the upper layer or portion of the water contained by the chamber is moved downwardly, and thus cause that portion of the water which has become more or less saturated with the gas to be replaced by water that is not so fully saturated, to the end that the whole body of water will necessarily become saturated with the carbon dioxid or other gas more readily and quickly. To effect this rotation of the device, the gas-inlet controlled by one of the valves and the water and gas inlet from the injector have their orifices arranged so that the incoming fluids, whether it be the water and gas or the gas alone, shall impinge against blades so disposed that the impact of the incoming water or gas will cause its rotation. The rotation of the device will continue so long as either the water and gas or the gas continue to pass into the chamber. It will be understood that the apparatus is so arranged that as the aerated or charged beverage is drawn off a fresh supply is automatically delivered to the tank or chamber to replace the quantity drawn off, and hence there is no chance of the beverage becoming stale or devitalized by any cause.

With this general understanding of the improvements a detailed description thereof will now be given, reference being had to the accompanying drawings, in which—

Figure 1 is a vertical central sectional elevation of an apparatus embodying the invention. Fig. 2 is an enlarged central section of the injector. Fig. 3 is an enlarged sectional view of the valves, showing the reversing operation, one open and the other closed. Fig. 4 is a cross-section of the gas-supply pipe, showing the guide for the stem of the rotating device; and Fig. 5 is a plan view of the float, showing the central stem and the ears to which the valve-levers are connected.

As represented in Fig. 1, the apparatus includes a closed tank or chamber C, adapted to contain any desired quantity of water or other beverage, on the surface of which is arranged a float O. The float is of any ordinary construction, preferably a hollow metallic one, and having also a central orifice to permit the passage of the vertical rod A of the rotating device hereinafter referred to. This chamber is connected with a pipe 1, leading from a gas-supply tank or reservoir containing, for instance, carbon dioxid, with which the beverage contained in the chamber is to be charged. This pipe leads into the chamber and entirely across it and out again, connecting with an injector I, with which is also connected a water-supply pipe 2, from which injector the pipe continues and again enters the chamber and terminates in a nozzle 5.

The gas-pipe 1 within the chamber is provided with a valve V, the stem of which has a lever 6, connected with the float O, so that by the fall of the float the valve will be opened and the gas permitted to pass to the injector. When the float rises, the valve will be closed and the gas cut off from the injector. The same gas-pipe has a branch terminating in a nozzle 4, in which branch another valve W is interposed, the stem of which is also connected by rod 6 with the float O, so that when the float is in its lower position the valve will be closed and the gas will be cut off from passing to the nozzle 4, and when the float is in its high position the valve will be open and the gas permitted to pass from said nozzle into the chamber. The two valves V and W are so connected to the float that when the valve V is closed, preventing the passage of gas to the injector, the valve W will be open to permit the gas to pass into the chamber. When the float is in its down position, the valve W will be closed and the valve V open.

The orifices 4 and 5 are so disposed that the fluid passing into the chamber under more or less pressure, according to the pressure of the gas employed, will impinge upon the blades of a rotating propeller device F, which is secured to the upper end of the stem A before referred to, from which it will be seen that no matter whether it be the gas flowing into the chamber or whether it be the incoming water and gas the rotating device or propeller will be rotated, imparting a similar motion to the shaft.

In order to cause the water and gas with which it is saturated to circulate downwardly, so that the upper portion of the body of water, which has become more or less fully charged with the gas, shall be caused to move downward, so as to be replaced by water that is not so fully charged, so that it in turn shall become properly charged, the central shaft is provided with one or more revolving blades $M^I M^{II}$, the angularity of the blades of which are such as to cause this downward movement of the water or other beverage.

The chamber, of course, will be connected with a drawing-off pipe 3, by which the aerated or charged beverage may be drawn off from time to time, as desired.

The injector I, more fully illustrated in Fig. 2, and which, as before stated, is interposed in the gas-pipe 1, is interiorly provided with a stepped nozzle having orifices which permit the incoming gas to impinge upon the incoming water, so that the water will be properly forced from its inlet and the injector through the continuation of the pipe into the chamber.

The water-inlet pipe, Fig. 2, is provided with a check-valve $ch^I$, held to its seat by a spring $s$, preventing the backing up of the gas into the water-supply pipe. The outlet from the injector is similarly provided with a valve $ch^{II}$, also backed up by a spring $s$, preventing the escape of pressure from the chamber C should the pressure in the injector or the supply of gas become lower from any reason than that in the chamber.

Instead of using an ordinary stop-valve we prefer to use the one shown in Fig. 3, wherein the passage of the gas is controlled by a flexible diaphragm $r$, borne upon by an interior button carried by a screw-stem 7, to which is connected the lever 6, already referred to.

When the lever is moved upwardly, pressure on the flexible diaphragm $r$ will be relieved, so that the gas will flow through the valve, and when the lever is moved in the opposite direction the diaphragm will be seated and the flow of gas stopped. The same construction will apply to the valve V, before referred to, except that when the lever 6 is moved downwardly the valve will be open and when moved in the reverse direction will be closed.

The central shaft or stem A, before referred to, may obviously be mounted for rotation in any suitable manner. As shown, however, its lower end is stepped into the base of the chamber and its upper end is guided by an eye projecting from a ring R, secured to the gas-pipe before referred to and as shown in Fig. 4.

In operating the apparatus the water-supply pipe 2 is first opened and the gas immediately thereafter allowed to flow through the pipe 1. When the apparatus is first started, the carbonating-chamber is empty and the float O is in its down position, causing the valve V to be opened and the valve W to be closed. The gas thus passes to the injector I, mixes with the water or other liquid, and enters the chamber by the orifice 5. The combined water and gas thus entering the chamber causes the rotating device F to be rotated, and in like manner the circulating-blades $M^I M^{II}$. It will be seen that in case the blades F become immersed their rotation would be greatly impeded. Hence the float O in preventing this immersion serves a very useful function. This operation continues until the float reaches its high position, whereupon the valve V becomes closed and the valve W opened, so that the gas instead of passing to the injector passes directly to the orifice 4 and by its impingement and pressure continuing the rotation of the device F until the pressure within the chamber is equal that in the pipe 1, when the rotations will be stopped, it being understood, of course, that the entire space above the level of the water in the chamber becomes filled with gas, so that the water can at all times absorb the gas to the maximum, the absorption being aided by the circulation of the water heretofore described.

It will also be understood that as soon as the pressure in the carbonating-chamber exceeds the water-pressure the check-valve at the end of the injector will be closed.

As soon as any of the aerated beverage is drawn by the pipe 3 the float O will consequently fall and the valves V and W will be manipulated so that a fresh supply of water and gas will be admitted to the chamber, and these operations will continue and be effected automatically at each withdrawal of water from the chamber.

While there has been shown and described a particular form of apparatus which may practically carry out the invention, we do not thereby desire to restrict ourselves to the particular form and construction chosen for illustration, as it is obvious that those skilled in the art may readily suggest modifications thereof.

It is to be understood that while we have described, shown, and claimed certain of the improved means in connection with the aerating apparatus these means are applicable to other devices, and hence are not necessarily limited to such an apparatus. The term "reversely operating" as applied to the valves in the claims is intended to mean that when one valve is opened the other is closed, and vice versa.

What we claim is—

1. In an aerating apparatus, the combination of a chamber and fluid-supply pipe leading into the chamber and having two outlets, a water-inlet connected to one of said outlets, two valves in said pipe, and a float within the chamber connected to operate said valves so that when one valve is opened the other is closed, as set forth.

2. In an aerating apparatus, the combination of a chamber and fluid-supply pipe leading into the chamber, a valve in said pipe, a float within the chamber connected to operate said valve, and a rotating agitating device immersed by the liquid and having blades above the level of the contained liquid impinged on by the incoming fluid from said supply-pipe, as set forth.

3. In an aerating apparatus, the combination of a chamber and gas-supply pipe having two outlets leading to said chamber, a water-supply also communicating with said chamber, and float-controlled means for controlling each of the gas-inlets, as set forth.

4. In an aerating apparatus, the combination of a chamber and gas-supply pipe leading to said chamber, an uninterrupted water-supply communicating with the gas-supply pipe, and automatically-operated valves for controlling the supply of gas to the water-supply or to the chamber according to the height of water therein as set forth.

5. In an aerating apparatus, the combination of a carbonating-chamber, a gas-supply pipe leading to said chamber and having two orifices, a water-supply communicating with one of said orifices, valves interposed in the pipe leading to said orifices, and automatic means for reversely operating said valves controlled by the height of water or other beverage in said chamber as set forth.

6. In an aerating apparatus, the combination of a carbonating-chamber a gas-supply pipe leading to said chamber and having two orifices a water-supply communicating with one of said orifices valves interposed in the pipe leading to said orifices automatic means for reversely operating said valves controlled by the height of water or other beverage in said chamber as set forth.

7. In an aerating apparatus, the combination, of a chamber, a gas-supply pipe leading to said chamber and having two orifices, a water-supply communicating with one of said orifices, valves interposed in the pipe leading to said orifices, means for reversely operating said valves controlled by the height of water or other beverage in said chamber, and a rotatable agitating device operated by the pressure of the incoming fluid from either one of said orifices, as set forth.

8. In an aerating apparatus the combination of a carbonating-chamber a gas-supply pipe leading to said chamber and having two orifices a water-supply communicating with one of said orifices valves interposed in the pipe leading to said orifices means for operating said valves controlled by the height of water or other beverage in said chamber and a rotatable agitating device operated by the pressure of the incoming fluid from either of said orifices and a float-operated means for maintaining a constant level of the liquid, as set forth.

9. In an aerating apparatus the combination of two gas-outlets discharging into the aerating-chamber valves controlling said outlets a water-supply connecting with one of said gas-outlets and a float for simultaneously controlling said valves closing one and opening the other as set forth.

10. In an aerating apparatus the combination of a chamber a gas-supply leading to said chamber, a water-supply leading to the orifice of the gas-supply a valve for controlling the gas-supply and automatic means for controlling said valve and the level of the liquid in said chamber and a rotatable device immersed in the liquid for circulating the liquid in said chamber having blades above the contained liquid operated by the inflowing fluid-supply as set forth.

11. In an aerating apparatus the combination of a chamber a gas-supply having two inlets to said chamber a water-supply communicating with one of said inlets means for controlling the admission of gas from either one of said inlets and a rotatable device for circulating the liquid in said chamber operated by the pressure passing from either one of said inlets, as set forth.

12. In an aerating apparatus the combination of a chamber a gas-supply leading to said chamber a rotatable device operated by the pressure from the gas-supply admitted above the level of the contained liquid means for maintaining said level substantially constant and means operated by said rotatable device for causing the downward circulation of the water in said chamber as set forth.

13. The combination of a chamber, an inlet for supplying gas thereto, an injector connected to a liquid-supply and to a gas-supply, valves for controlling the supply of gas to the chamber and to the injector, a float in the chamber and connections between the float and the valves, whereby the supply of gas to the chamber is closed, and the supply of gas to the injector is opened as the liquid in the chamber falls, as set forth.

14. In an aerating apparatus the combination of a chamber a drawing-off pipe a supply for water and gas and a rotatable device extending above the level of the liquid and having one or more revolving blades the angularity of the blade or blades being such as to cause a downward movement of the water or other beverage, and means for maintaining the level of said liquid substantially constant as set forth.

15. In an aerating apparatus the combination of a carbonating-chamber, a drawing-off pipe, a gas-supply pipe leading into and through said chamber projecting outwardly of said chamber and connecting with the water-supply chamber on top of the carbonating-chamber as set forth.

16. In an aerating apparatus the combination of a carbonating-chamber, a drawing-off pipe, a gas-supply pipe leading into and through said chamber, having on the inside of said chamber a branch, two valves of which one is interposed in said pipe and the other in said branch and a ring or collar to which the stem or shaft of a rotatable agitating device is journaled, as set forth.

In testimony whereof we have hereunto set our names in the presence of two witnesses.

EMIL KOENIG.
MITCHELL L. ERLANGER.

Witnesses:
WALTER H. ROSENBAUM,
M. G. HOLSTINE.